US012710876B2

(12) United States Patent
Donga et al.

(10) Patent No.: US 12,710,876 B2
(45) Date of Patent: Aug. 18, 2026

(54) SYSTEMS, METHODS, AND MEDIA FOR REDUCING PERFORMANCE PENALTIES CAUSED BY READ RE-TRIES

(71) Applicant: SK hynix NAND Product Solutions Corp., Rancho Cordova, CA (US)

(72) Inventors: Parth Rameshbhai Donga, Folsom, CA (US); Hinesh Shah, Folsom, CA (US); Giuseppina Puzzilli, Boise, ID (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 19/005,960

(22) Filed: Dec. 30, 2024

(65) Prior Publication Data

US 2026/0186655 A1 Jul. 2, 2026

(51) Int. Cl.
*G06F 3/06* (2006.01)

(52) U.S. Cl.
CPC .......... *G06F 3/0611* (2013.01); *G06F 3/0653* (2013.01); *G06F 3/0659* (2013.01); *G06F 3/0679* (2013.01)

(58) Field of Classification Search
CPC .... G06F 3/0611; G06F 3/0653; G06F 3/0659; G06F 3/0679
See application file for complete search history.

(56) References Cited

U.S. PATENT DOCUMENTS 5,623,595 A * 4/1997 Bailey ................. G06F 11/1076 714/764
9,858,002 B1 * 1/2018 Goss ..................... G06F 3/0619
10,573,397 B1 2/2020 Sehgal et al.
2012/0236656 A1 9/2012 Cometti
2016/0225461 A1 8/2016 Tuers et al.
2020/0118636 A1 4/2020 Athreya et al.
2021/0012845 A1 * 1/2021 Xie ....................... G06F 3/0683
2021/0349782 A1 * 11/2021 Ki ......................... G06F 3/0673
2022/0291995 A1 9/2022 Cadloni et al.
2023/0161478 A1 * 5/2023 Tankasala ............. G06F 3/0611 711/103
2024/0071547 A1 * 2/2024 Hu ...................... G06F 11/1048

OTHER PUBLICATIONS

International Search Report and Written Opinion dated Mar. 12, 2026 in International Patent Application No. PCT/US2025/053800, pp. 1-9.

* cited by examiner

*Primary Examiner* — Larry T Mackall
(74) *Attorney, Agent, or Firm* — Byrne Poh LLP

(57) ABSTRACT

Mechanism, including systems, methods, and media, for reducing performance penalties caused by read re-tries are provided, the mechanisms including: maintaining a count of total reads for a block of non-volatile memory; maintaining a count of read re-tries for the block; determining a trigger rate based on the count of read re-tries for the block and the count of total reads for the block using a hardware processor; and tagging the block for data refresh based at least in part on the trigger rate meeting a trigger rate threshold. In some embodiments, the mechanisms further comprise: maintaining a count of block moves for a die corresponding to the block; and warning a user of device degradation based at least in part on the count of block moves meeting a maximum-number-of-moves-per-die threshold.

21 Claims, 2 Drawing Sheets

SYSTEMS, METHODS, AND MEDIA FOR REDUCING PERFORMANCE PENALTIES CAUSED BY READ RE-TRIES

BACKGROUND

In solid-state drives (SSDs), read retries, e.g., due to level shifts and/or degradation in programmed distributions caused by read-disturb and/or data-retention effects, can cause performance penalties during read workloads. For example, because re-retries result in multiple read attempts for the same host read command, re-retries result in increased latency and lower Quality of Service (QoS). When the trigger rate of read re-tries increases, an exponential degradation of QoS may be observed. It is therefore desirable to reduce read re-tries.

Accordingly, new mechanisms for reducing performance penalties caused by read re-tries are desirable.

SUMMARY OF THE INVENTION

In accordance with some embodiments, mechanisms, including systems, methods and media for reducing performance penalties caused by read re-tries are provided.

In some embodiments, systems for reducing performance penalties caused by read re-tries are provided, the systems comprising: memory; and at least one hardware processor that is collectively configured to at least: maintain a count of total reads for a block of non-volatile memory; maintain a count of read re-tries for the block; determine a trigger rate based on the count of read re-tries for the block and the count of total reads for the block; and tag the block for data refresh based at least in part on the trigger rate meeting a trigger rate threshold. In some of these embodiments, the at least one hardware processor is further collectively configured to at least: maintain a count of block moves for a die corresponding to the block; and warn a user of device degradation based at least in part on the count of block moves meeting a maximum-number-of-moves-per-die threshold. In some of these embodiments, maintaining the count of total reads for the block comprises incrementing the count of total reads for the block in response to a successful read from the block. In some of these embodiments, maintaining the count of read re-tries for the block comprises incrementing the count of read re-tries for the block in response to a successful read re-try from the block. In some of these embodiments, the trigger rate is equal to the count of read re-tries for the block divided by the count of total reads for the block. In some of these embodiments, the at least one hardware processor is further collectively configured to at least adjust the count of read re-tries in response to determining that a read re-try is not needed. In some of these embodiments, the at least one hardware processor is further collectively configured to at least: determine that a read retry was not successful; and perform error handing in response to determining that the read retry was not successful.

In some embodiments, methods for reducing performance penalties caused by read re-tries are provided, the method comprising: maintaining a count of total reads for a block of non-volatile memory; maintaining a count of read re-tries for the block; determining a trigger rate based on the count of read re-tries for the block and the count of total reads for the block using a hardware processor; and tagging the block for data refresh based at least in part on the trigger rate meeting a trigger rate threshold. In some of these embodiments, the methods further comprise: maintaining a count of block moves for a die corresponding to the block; and warning a user of device degradation based at least in part on the count of block moves meeting a maximum-number-of-moves-per-die threshold. In some of these embodiments, maintaining the count of total reads for the block comprises incrementing the count of total reads for the block in response to a successful read from the block. In some of these embodiments, maintaining the count of read re-tries for the block comprises incrementing the count of read re-tries for the block in response to a successful read re-try from the block. In some of these embodiments, the trigger rate is equal to the count of read re-tries for the block divided by the count of total reads for the block. In some of these embodiments, the methods further comprise adjusting the count of read re-tries in response to determining that a read re-try is not needed. In some of these embodiments, the methods further comprise: determining that a read retry was not successful; and performing error handing in response to determining that the read retry was not successful.

In some embodiments, non-transitory computer-readable media containing computer executable instructions that, when executed by a processor, cause the processor to perform a method for reducing performance penalties caused by read re-tries are provided, the method comprising: maintaining a count of total reads for a block of non-volatile memory; maintaining a count of read re-tries for the block; determining a trigger rate based on the count of read re-tries for the block and the count of total reads for the block; and tagging the block for data refresh based at least in part on the trigger rate meeting a trigger rate threshold. In some of these embodiments, the method further comprises: maintaining a count of block moves for a die corresponding to the block; and warning a user of device degradation based at least in part on the count of block moves meeting a maximum-number-of-moves-per-die threshold. In some of these embodiments, maintaining the count of total reads for the block comprises incrementing the count of total reads for the block in response to a successful read from the block. In some of these embodiments, maintaining the count of read re-tries for the block comprises incrementing the count of read re-tries for the block in response to a successful read re-try from the block. In some of these embodiments, the trigger rate is equal to the count of read re-tries for the block divided by the count of total reads for the block. In some of these embodiments, the method further comprises adjusting the count of read re-tries in response to determining that a read re-try is not needed. In some of these embodiments, the method further comprises: determining that a read retry was not successful; and performing error handing in response to determining that the read retry was not successful.

DETAILED DESCRIPTION

In accordance with some embodiments, mechanisms, including systems, methods and media for reducing performance penalties caused by read re-tries are provided.

In accordance with some embodiments, mechanisms described herein count the number of read re-try triggers per block and count the number of total reads per block, and then, when a default read operation for a block fails to succeed but an immediately subsequent read re-try for the block is successful, the mechanisms compute a trigger rate for the block and determine if the trigger rate meets (e.g., is greater than, or greater than or equal to) a trigger rate threshold to decide if the data in the block needs to be refreshed and moved to a new block. In some embodiments, these mechanisms can additionally warn a user of device degradation when the trigger rate meets the trigger rate threshold and when a count of block moves for a die corresponding to the read operation meets a maximum-number-of-moves-per-die threshold.

Figure 1:
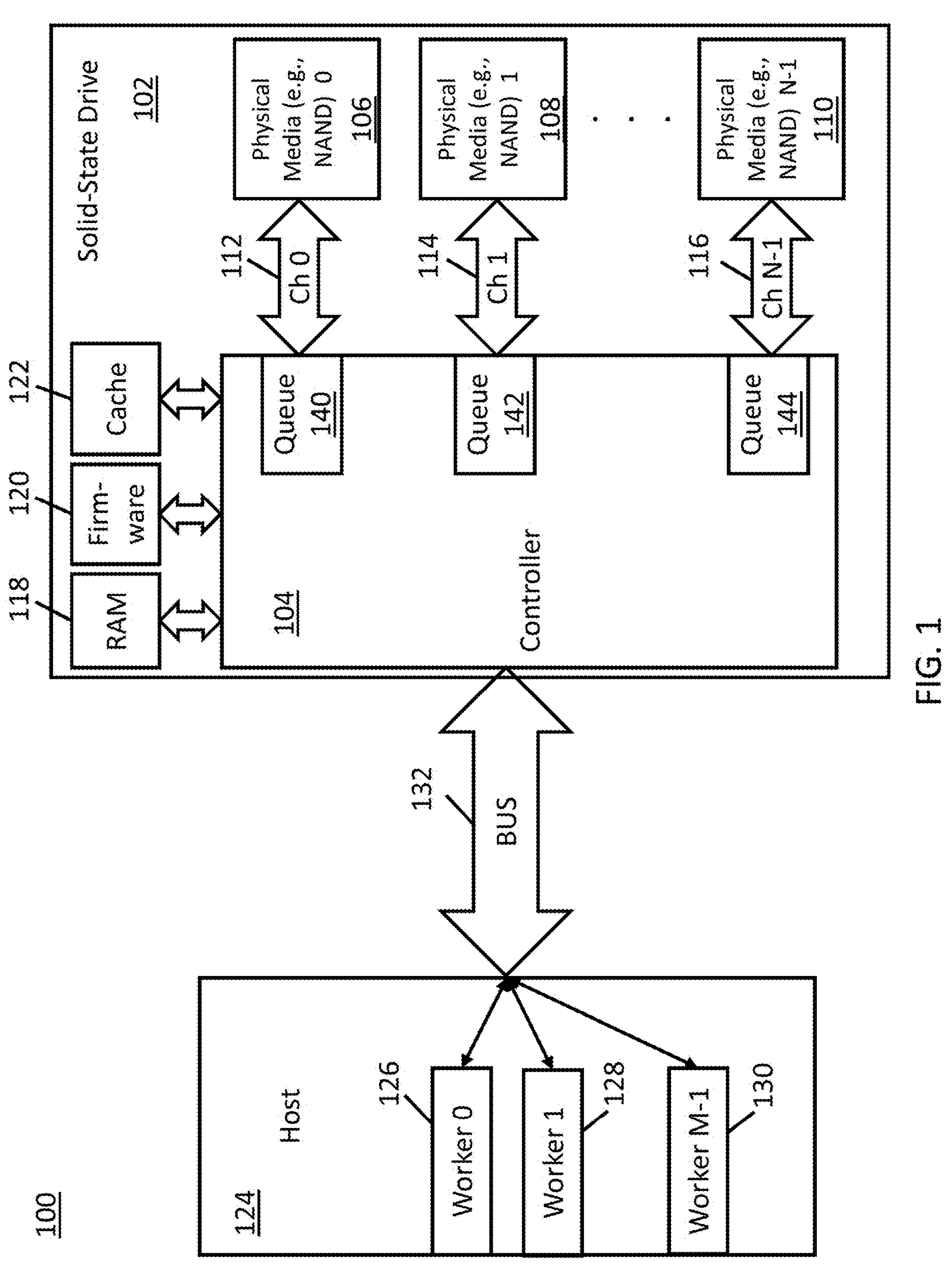
FIG. 1 is a block diagram of example hardware that can be used in some embodiments.

Turning to FIG. 1, an example block diagram of a solid-state drive 102 coupled to a host device 124 via a bus 132 in accordance with some embodiments is illustrated.

As shown, solid-state drive 102 can include a controller 104, physical media (e.g., NAND devices) 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor (s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc. In some embodiments, controller 104 can be coupled to, or include (as shown), channel queues 140, 142, and 144 for transmitting commands (which can include command data) over channels 112, 114, and 116 to physical media 106, 108, and 110, respectively.

Physical media 106, 108, and 110 can be any suitable physical media for storing information (which can include data, programs, and/or any other suitable information that can be stored in a solid-state drive) in some embodiments. For example, the physical media can be NAND devices in some embodiments.

The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media (such as single-level cell (SLC) NAND devices, multilevel cell (MLC) NAND devices, triple-level cell (TLC) NAND devices, quad-level cell (QLC) NAND devices, penta-level cell (PLC) NAND, NAND with any other suitable levels of cells, 2D NAND devices, 3D NAND devices, NOR flash memory, any other suitable flash technology, phase change memory technology, and/or other any other suitable volatile and/or non-volatile memory storage technology) can be used in some embodiments. Each physical media can have any suitable size in some embodiments. While physical media 106, 108, and 110 can be implemented using NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
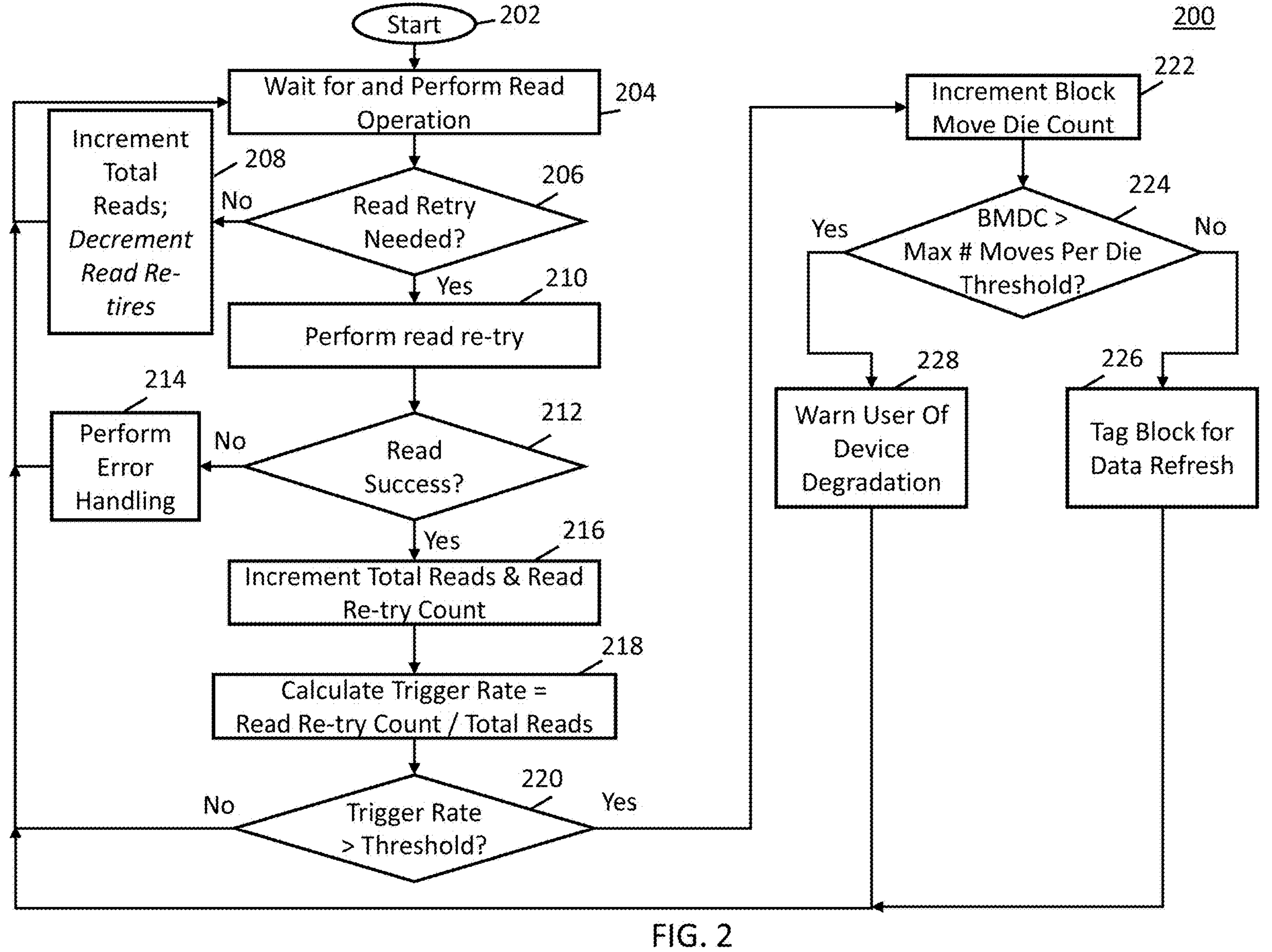
FIG. 2 is a flow diagram of an example processes that can be used for reducing performance penalties caused by read re-tries in accordance with some embodiments.

Turning to FIG. 2, an example 200 of a process for reducing performance penalties, such as increased latency and reduced Quality of Service (QoS), caused by read re-tries in accordance with some embodiments is illustrated. Process 200 can be executed by an SSD controller, such as controller 104, in some embodiments.

In some embodiments, upon or prior to process 200 beginning, the process can initialize, for each block of an SSD, a count of total reads and a count of read re-tries, and can also initialize, for each die, a count of block moves for the die (BMDC) to any suitable value (such as zero).

After process 200 begins at 202, the process can wait for and perform a read operation at 204. Process 200 can wait for a read operation from any suitable source and perform a read operation in any suitable manner, in some embodiments. For example, in some embodiments process 200 can wait for a read operation to be received as a read command from a host device, such as host device 124.

Next, at 206, process 200 can determine if a read retry is needed. Process 200 can determine if a read retry is needed in any suitable manner, in some embodiments. For example, in some embodiments process 200 can determine if a read retry is needed by determining that there was an error in performing the read operation at 204 based on error correction code (ECC).

If it is determined at 206 that a read retry is not needed, then process 200 can increment the count of the total reads for the block corresponding to the read operation at 208 and then loop back to 204. Process 200 can increment the count of the total reads for the block in any suitable manner, in some embodiments. For example, in some embodiments process 200 can increment the count of the total reads by adding one to the count of total reads. In some embodiments, the count of total reads can be capped at any suitable value, such as 255, after which the count will not be further incremented.

In some embodiments, if is determined at 206 that a read retry is not needed, then process 200 can additionally decrement the count of read re-retries for the block corresponding to the read operation at 208. Process 200 can decrement the count of read re-retries for the block in any suitable manner, in some embodiments. For example, in some embodiments process 200 can decrement the count of read re-retries by subtracting one from the count of read re-tries. In some embodiments, decrementing the count of read re-tries will not cause the count to go below zero. In some embodiments, process 200 may only decrement the count of read-retries after the total count of reads has reached a given value, such as 255.

If it is determined at 206 that a read retry is needed, then process 200 can perform a read re-try at 210. Process 200 can perform a read re-try in any suitable manner, in some embodiments. For example, in some embodiments process 200 can perform a read re-try by triggering a read re-try mechanism.

Then, at 212, process 200 can determine whether the read re-try performed at 210 was successful. Process 200 can determine whether the read re-try performed at 210 was successful in any suitable manner, in some embodiments. For example, in some embodiments process 200 can determine whether the read re-try performed at 210 was successful based on the output of the ECC.

If it is determined at 212 that the re-retry performed at 210 was not successful, then process 200 can perform error handling at 214 and then loop back to 204. Process 200 can perform error handling in any suitable manner, in some embodiments. For example, in some embodiments process 200 can perform error handling by triggering an error handling mechanism. Any suitable error handling mechanism can be used in some embodiments. For example, in some embodiments, an error handling mechanism can implement a redundant array of independent disks (RAID) method for data redundancy and fault tolerance to recover data and move the data to one or more newer physical blocks to avoid further data corruption.

If it is determined at 212 that the re-retry performed at 210 was successful, then process 200 can increment the count of total reads and increment the count of read re-retries, each for the block corresponding to the read operation, at 216. Process 200 can increment the count of total reads in any suitable manner, in some embodiments. For example, in some embodiments process 200 can increment the count of the total reads by adding one to the count of total reads. In some embodiments, the count of total reads can be capped at any suitable value, such as 255, after which the count will not be further incremented. Process 200 can increment the count of read re-retries in any suitable manner, in some embodiments. For example, in some embodiments process 200 can increment the count of read re-retries by adding one to the count of read re-tries. In some embodiments, the count of read re-tries can be capped at any suitable value, such as 255, after which the count will not be further incremented.

Next, at 218, process can calculate a trigger rate for the block corresponding to the read operation as the count of read re-tries for the block divided by the count of the total reads for the block. Process 200 can calculate a trigger rate as the count of read re-tries divided by the count of the total reads in any suitable manner, in some embodiments.

Then, at 220, process 200 can determine whether the trigger rate meets a trigger rate threshold. Process 200 can determine whether the trigger rate meets the trigger rate threshold in any suitable manner, in some embodiments. For example, in some embodiments process 200 can determine whether the trigger rate meets the trigger rate threshold by determining that the trigger rate meets the trigger rate threshold when the trigger rate is greater than or equal to the trigger rate threshold and determining that the trigger rate does not meet the trigger rate threshold otherwise. As another example, in some embodiments, process 200 can determine whether the trigger rate meets the trigger rate threshold by determining that the trigger rate meets the trigger rate threshold when the trigger rate is greater than the trigger rate threshold and determining that the trigger rate does not meet the trigger rate threshold otherwise. In some embodiments, any suitable value, such as 0.1, can be used for the trigger rate threshold.

If it is determined at 220 that the trigger rate does not meet the threshold, then process 200 can loop back to 204. Otherwise, process 200 can proceed to 222 at which it can increment the BMDC for the die corresponding to the read operation. Process 200 can increment the BMDC in any suitable manner, in some embodiments. For example, in some embodiments process 200 can increment the BMDC by adding one to the BMDC.

Next, at 224, process 200 can determine whether the BMDC for the die corresponding to the read operation meets a maximum-number-of-moves-per-die (MNMPD) threshold. Process 200 can determine whether the BMDC meets the MNMPD threshold in any suitable manner, in some embodiments. For example, in some embodiments, process 200 can determine whether the BMDC meets the MNMPD threshold by determining that the BMDC meets the MNMPD threshold when the BMDC is greater than or greater than or equal to the MNMPD threshold, and determining that the BMDC does not meet the MNMPD threshold otherwise. As another example, in some embodiments, process 200 can determine whether the BMDC meets the MNMPD threshold by determining that the BMDC meets the MNMPD threshold when the BMDC is greater than the MNMPD threshold, and determining that the BMDC does not meet the MNMPD threshold otherwise.

If it is determined at 224 that the BMDC for the die corresponding to the read operation does not meet the MNMPD threshold, then process can tag the block corresponding to the read operation for a data refresh at 226 and then loop back to 204. Process 200 can tag the block corresponding to the read operation for a data refresh in any suitable manner, in some embodiments. For example, in some embodiments process 200 can tag the block corresponding to the read operation for a data refresh by triggering a device data handling mechanism that is used to move data due to read-disturb, background data fresh, and/or any other suitable criteria or criterion. In response to being tagged for a data refresh, any suitable process can perform a data refresh on the block corresponding to the read operation in any suitable manner, in some embodiments.

If it is determined at 224 that the BMDC for the die corresponding to the read operation does meet the MNMPD threshold, then process can warn a user of device degradation and/or provide an option refresh all the valid data on the device at 228 and then loop back to 204. Process 200 can warn a user of device degradation in any suitable manner, in some embodiments. For example, in some embodiments process 200 can warn a user of device degradation by generating a suitable warning in error logs.

While FIG. 2 describes counters that count upward, it should be understood that process 200 could alternatively be implemented with counters that count downward. In such implementations, a value meeting a threshold could thus be determined as occurring when the value is less than and/or equal to the threshold.

In some embodiments, at least some of the above-described blocks of the process of FIG. 2 can be executed or performed in any order or sequence not limited to the order and sequence shown in and described in connection with the figure. Also, some of the above blocks of the process of FIG. 2 can be executed or performed substantially simultaneously where appropriate or in parallel to reduce latency and processing times in some embodiments. Additionally or alternatively, some of the above described blocks of the process of FIG. 2 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for reducing performance penalties caused by read re-tries are provided. These mechanisms can improve the performance of SSDs by tagging a block corresponding to a read operation for a data refresh when a trigger rate meets a threshold and by warning a user of device degradation when a trigger rate meets a trigger rate threshold and a count of block moves for a die corresponding to a read operation meets a maximum-number-of-moves-per-die threshold.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for reducing performance penalties caused by read re-tries, comprising:

memory; and at least one hardware processor that is collectively configured to at least:

maintain a count of total reads for a block of non-volatile memory;

maintain a count of read re-tries for the block, wherein maintaining the count of read re-tries for the block comprises adjusting the count of read re-tries in response to determining that a read re-try is not needed;

determine a trigger rate based on the count of read re-tries for the block and the count of total reads for the block; and tag the block for data refresh based at least in part on the trigger rate meeting a trigger rate threshold.

2. The system of claim 1, wherein the at least one hardware processor is further collectively configured to at least:

maintain a count of block moves for a die corresponding to the block; and warn a user of device degradation based at least in part on the count of block moves meeting a maximum-number-of-moves-per-die threshold.

3. The system of claim 1, wherein maintaining the count of total reads for the block comprises incrementing the count of total reads for the block in response to a successful read from the block.

4. The system of claim 1, wherein maintaining the count of read re-tries for the block comprises incrementing the count of read re-tries for the block in response to a successful read re-try from the block.

5. The system of claim 1, wherein the trigger rate is equal to the count of read re-tries for the block divided by the count of total reads for the block.

6. The system of claim 1, wherein the adjusting the count of read re-tries in response to determining that a read re-try is not needed comprises decrementing the count of read re-tries.

7. The system of claim 1, wherein the at least one hardware processor is further collectively configured to at least:

determine that a read retry was not successful; and perform error handing in response to determining that the read retry was not successful.

8. A method for reducing performance penalties caused by read re-tries, comprising:

maintaining a count of total reads for a block of non-volatile memory;

maintaining a count of read re-tries for the block, wherein maintaining the count of read re-tries for the block comprises adjusting the count of read re-tries in response to determining that a read re-try is not needed;

determining a trigger rate based on the count of read re-tries for the block and the count of total reads for the block using a hardware processor; and tagging the block for data refresh based at least in part on the trigger rate meeting a trigger rate threshold.

9. The method of claim 8, further comprising:

maintaining a count of block moves for a die corresponding to the block; and warning a user of device degradation based at least in part on the count of block moves meeting a maximum-number-of-moves-per-die threshold.

10. The method of claim 8, wherein maintaining the count of total reads for the block comprises incrementing the count of total reads for the block in response to a successful read from the block.

11. The method of claim 8, wherein maintaining the count of read re-tries for the block comprises incrementing the count of read re-tries for the block in response to a successful read re-try from the block.

12. The method of claim 8, wherein the trigger rate is equal to the count of read re-tries for the block divided by the count of total reads for the block.

13. The method of claim 8, wherein the adjusting the count of read re-tries in response to determining that a read re-try is not needed comprises decrementing the count of read re-tries.

14. The method of claim 8, further comprising:

determining that a read retry was not successful; and performing error handing in response to determining that the read retry was not successful.

15. A non-transitory computer-readable medium containing computer executable instructions that, when executed by a processor, cause the processor to perform a method for reducing performance penalties caused by read re-tries, the method comprising:

maintaining a count of total reads for a block of non-volatile memory;

maintaining a count of read re-tries for the block, wherein maintaining the count of read re-tries for the block comprises adjusting the count of read re-tries in response to determining that a read re-try is not needed;

determining a trigger rate based on the count of read re-tries for the block and the count of total reads for the block; and tagging the block for data refresh based at least in part on the trigger rate meeting a trigger rate threshold.

16. The non-transitory computer-readable medium of claim 15, wherein the method further comprises:

maintaining a count of block moves for a die corresponding to the block; and warning a user of device degradation based at least in part on the count of block moves meeting a maximum-number-of-moves-per-die threshold.

17. The non-transitory computer-readable medium d of claim 15, wherein maintaining the count of total reads for the block comprises incrementing the count of total reads for the block in response to a successful read from the block.

18. The non-transitory computer-readable medium of claim 15, wherein maintaining the count of read re-tries for the block comprises incrementing the count of read re-tries for the block in response to a successful read re-try from the block.

19. The non-transitory computer-readable medium of claim 15, wherein the trigger rate is equal to the count of read re-tries for the block divided by the count of total reads for the block.

20. The non-transitory computer-readable medium of claim 15, wherein the adjusting the count of read re-tries in response to determining that a read re-try is not needed comprises decrementing the count of read re-tries.

21. The non-transitory computer-readable medium of claim 15, wherein the method further comprises:

determining that a read retry was not successful; and performing error handing in response to determining that the read retry was not successful.

* * * * *